Nov. 15, 1960 — E. MORF — 2,959,913
REGULATOR CONTROL DEVICE FOR WATCHES
Filed Jan. 13, 1959 — 3 Sheets-Sheet 1

Inventor:
Ernest Morf
by: Michael S. Striker
Attorney

Nov. 15, 1960   E. MORF   2,959,913
REGULATOR CONTROL DEVICE FOR WATCHES
Filed Jan. 13, 1959   3 Sheets-Sheet 2
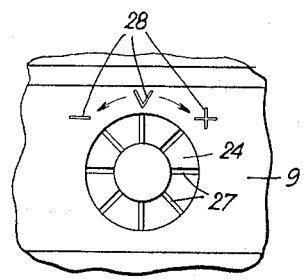
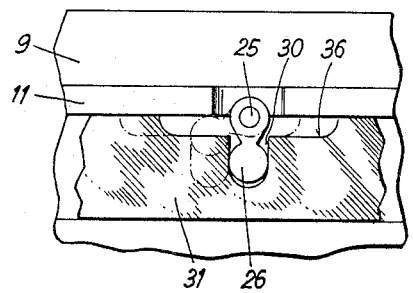
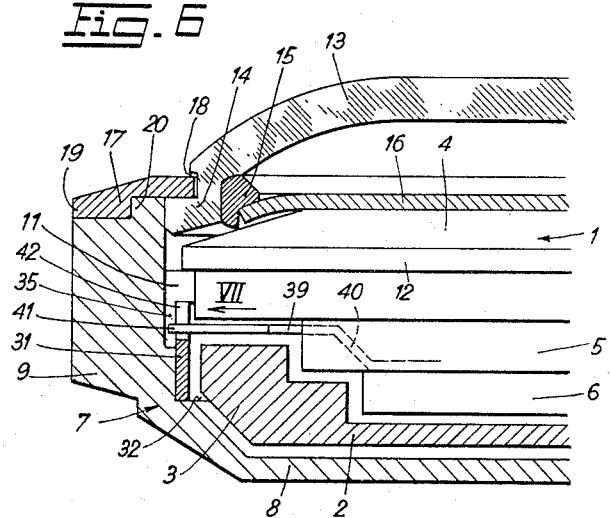
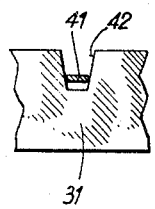
Inventor:
Ernest Morf
by:
Michael S. Striker
Attorney Nov. 15, 1960  E. MORF  2,959,913
REGULATOR CONTROL DEVICE FOR WATCHES
Filed Jan. 13, 1959  3 Sheets-Sheet 3

Inventor:
Ernest Morf
by:
Michael S. Striker
Attorney

United States Patent Office 2,959,913
Patented Nov. 15, 1960

2,959,913
REGULATOR CONTROL DEVICE FOR WATCHES

Ernest Morf, Beauregard 15 NE., La Chaux-de-Fonds, Switzerland

Filed Jan. 13, 1959, Ser. No. 786,497

Claims priority, application Switzerland Jan. 15, 1958

7 Claims. (Cl. 58—109)

This invention relates to regulator control devices for watches and in particular to regulator control devices which can be actuated from outside the watchcase.

Control devices for resetting the regulator from outside the watchcase are usually provided in watertight watches, on the one hand, in order to avoid injuring the watchcase tightening parts or members by opening the watchcase or closing it again every time a correction of the regulator is made, and on the other hand, in order to enable the watch carrier making himself the necessary rate corrections.

To permit actuating the regulator from outside the watchcase the devices known in the art usually comprise a control member mounted either on the bottom or on the case band, said control member actuating the regulator either by turning on itself or by moving in an axial direction. In both cases the control members known are extending in the free space of the watchcase comprised between the upper part of the bridges and the wall of the watchcase surrounding said part of the bridges. Such a control member can therefore not be used in a watch with a selfwinding mechanism operated by the unlimited movements in either direction of an oscillating weight journalled in the center of the movement and comprising a peripheral heavy sector surrounding the upper part of the watch movement bridges.

It is therefore an object of the invention to connect the control member of the regulator control device, which is accessible from outside the watchcase, to the regulator by means of a movable ring surrounding the watch movement and mounted in the watchcase for free rotation coaxially to the movement.

A further object of the invention is to provide with a control device of said type a selfwinding watch the movement of which is located in a casing comprising a member forming both the bottom and the case band.

Still further objects of the invention will become apparent in the course of the following description.

One embodiment and two variants of the regulator control device according to the invention are represented diagrammatically and by way of example in the drawings annexed to this specification.

In the drawings:

Fig. 3 is a part elevational view in the direction of arrow III of Fig. 2;

Fig. 4 is a part elevational view in the direction of arrow IV of Fig. 2;

Fig. 5 shows a variant of a member of Fig. 4;

Fig. 6 is an enlarged part sectional view along line VI—VI of Fig. 1;

Fig. 7 is an elevational view in the direction of arrow VII—VII of a detail of Fig. 6.

Figure 1:
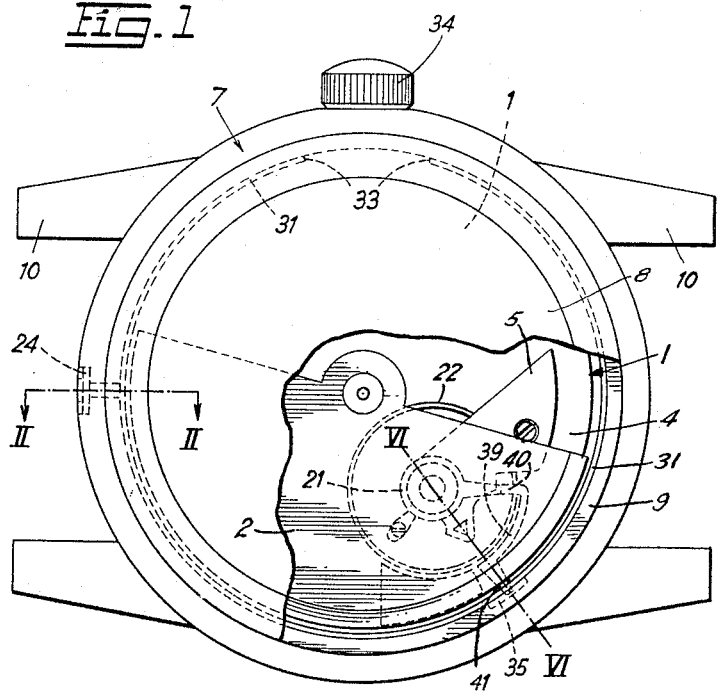
Fig. 1 is a diagrammatic plane view, partially in section, of the bottom side of a wrist-watch provided with said embodiment.

The wrist-watch represented in the drawings comprises a movement 1 which can be wound up automatically by an oscillating weight 2 pivotally mounted in the center of the movement 1 for unlimited rotations in either direction.

The weight 2 is essentially constituted by a peripheral heavy sector 3 (Fig. 2) which is moving above the baseplate 4 and around the bridges 5, 6 forming together with the baseplate 4 the framework of the watch movement 1.

The latter is located in a watchcase comprising a member 7 which forms both the bottom 8 and the case band 9 thus avoiding the watertight gasket usually located between the bottom and the case band. The latter carries here the wrist-band attaching lugs 10.

Figure 2:
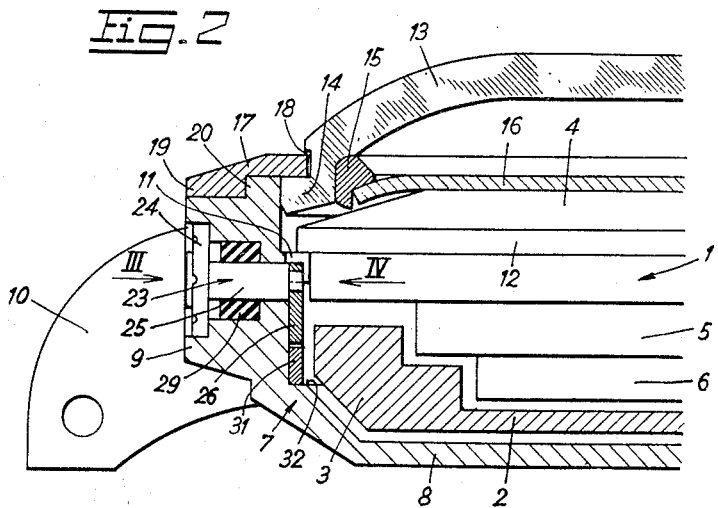
Fig. 2 is an enlarged part sectional view along line II—II of Fig. 1.

The movement 1 is set into the case member 7 from the upper side thereof (Fig. 2), i.e. from the side of the glass. The exact position of the movement 1 within member 7 is determined by an internal rim 11 of the case band 9 which receives a portion of the baseplate 4 and on which lies a peripheral shoulder 12 of the baseplate 4. The watchcase is closed by means of a protecting glass 13 provided with an annular peripheral shoulder 14 compressed radially against the upper part of the cylindrical inner wall of the case band 9 by means of a strengthening ring 15. This ring 15 is not only engaging the glass 13 but also the dial 16 fixed on to the watch movement 1 in order to fill the annular gap formed therebetween. To remove the glass 13 from the case band 9 a bezel 17 is set in a peripheral groove 18 of the glass. When the bezel 17 is set in place as shown in Fig. 2 a peripheral rim portion 19 thereof is surrounding an annular projection 20 of the case band 9. Moreover, the peripheral portion of the baseplate 4 located underneath the glass shoulder 14, which is apparent through said shoulder, is made invisible by the bezel 17 which is covering a sufficient part of the glass shoulder 14.

The running rate of the watch described may be corrected in the usual manner by moving the regulator 21 coaxially to the balance wheel 22. The regulator 21 may be moved from outside the watchcase, by means of a control member 23, which is located between two lugs 10 so that the wrist-band dissimulates said control member thus avoiding any unesthetic effect which could be caused thereby. The control member 23 is composed of a head portion having the form of a disk 24, a stem 25 made in one piece with the disk 24, and a crank lever 26 set with force fit on to a bearing portion provided at the inner end of the stem 25. Radial slots 27 (Fig. 3) are provided in the outer side face of the disk 24 to permit of rotating the disk 24 by means of a small screw driver. Indications 28 are moreover provided on the case band 9 around the disk 24 (Fig. 3) to indicate the direction in which this disk must be turned for producing the desired modification of the watch running rate. Instead of said indications 28, a scale could also be provided on the case band around the disk 24, one of the slots 27 being then colored in order to serve as adjusting mark. It will still be observed that the disk 24 cannot be caught for instance by a jacket or a shirt sleeve and that it remains therefore in the position in which it has been set, because this disk does not protrude out of its dodging in the case band 9 (Fig. 2).

As shown in the same figure the stem 25 of the control member 23 passes across the case band wall and this passage is tightly closed by a gasket 29. As shown in Fig. 4 the internal rim 11 of the case band 9 limits the rotary movements of the control member 23 in both directions, because this internal rim serves as abutting means for the crank lever 26.

The free end of the crank lever 26 extends, practically without any play, into a notch 30 (Fig. 4) provided in a flat cylindrical split ring 31 applied against the inner cylindrical wall of the case band 9 under the action of its own elasticity. This ring 31 is axially held in place in the watchcase between the rim 11 and the shoulder 32 of the case member 7.

As it may be deduced from Fig. 1, the notch 30 is provided at such a place of the ring 31 that the gap formed between the free ends 33 of ring 31 is situated opposite the winding and hand setting watch crown 34, thus enabling the winding and hand setting stem (not shown) to pass freely through said gap when the crank lever 26 and the notch 30 are engaging one another. Although the ring 31 is radially pressed against the inner wall of the case band 9 and although it is engaged between a rim 11 and a shoulder 32, it may nevertheless turn without any difficulty coaxially to the movement 1, under the action of the control member 23.

An axial slot 35 (Figs. 1 and 6) is provided in the cylindrical wall of the case band 9, across the rim 11 thereof, in order to enable introducing a pointed tool behind the ring 31 to remove the latter from its lodging if desired.

Fig. 4 shows in full lines the ring 31 in its middle position and in dot-and-dash lines this ring in an extreme position. To avoid any contact between the ring 31 and the part of the crank lever 26, which is fixed on to the stem 25, when the control member is actuated in either direction from the position shown in full lines in Fig. 4, an elongated notch 36 is provided in the ring 31.

Furthermore to avoid any lost motion between the control member 23 and the ring 31, the free end of the crank lever 26 should not have any play within the notch 30. The manufacturing precision of those parts can, however, be dispensed with by using the crank lever 37 shown in Fig. 5. The free end 38 of that crank lever 37, which enters the notch 30 of the ring 31, is constituted by a resilient circular portion having an outer diameter somewhat larger than the notch 30 so that this portion 38 is slightly compressed within the notch 30.

Figure 8:
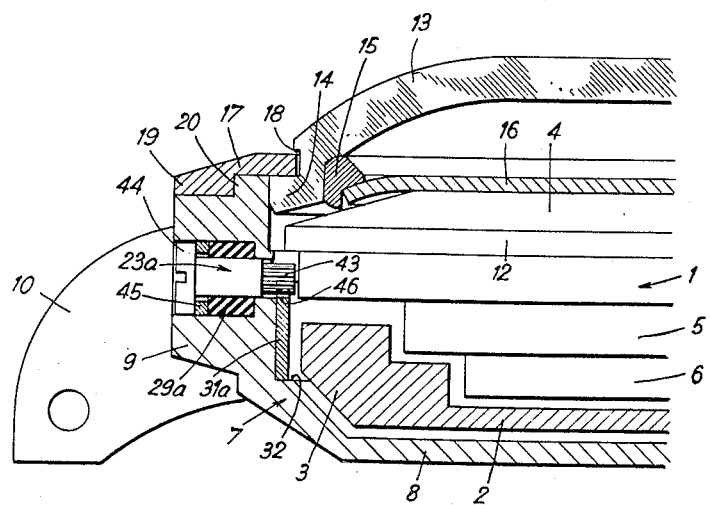
Fig. 8 is a part sectional view similar to that of Fig. 2 showing the second variant.

Instead of controlling the watch regulator by means of a member carrying a crank lever, and a ring provided with a notch, one could also ensure said control operation by means of the organs represented in the variant shown in Fig. 8. The control member 23a of this variant, which is accessible from outside the watchcase, also comprises a stem passing across the case band wall, at the same place as the stem 25 of the embodiment described above. The tightness of this passage is, however, ensured here by means of a gasket 29a held in a cylindrical lodging of the case band 9 by a ring 45. Furthermore a toothing 43 is cut at the inner end of the stem of member 23a and this toothing 43 is meshing with a corresponding toothing 46 cut in the upper edge of ring 31a. With the exception of the toothing 46 of ring 31a, which takes the place of notch 30 of ring 31, the rings 31 and 31a are identical. Eventually, the control member 23a has a small head portion 44 provided with a diametrical slot and said head portion bears on the ring 45. In spite of its sizes this head portion 44 enables actuating the control member 23a and consequently the ring 31a and the regulator 21 in a satisfactory manner. With respect to the disk 24 of the embodiment described above, the head portion 44 permits using a thinner case band. Since the control member 23a is countersunk in the case band 9, it cannot be caught accidentally and the friction exerted by the gasket 29a on the stem of member 23a is sufficient to hold the member 23a axially in place especially as no force thrusts this member outward from the watchcase, except its own weight.

As shown in Figs. 1 and 6 the usual pointer with regulators is replaced here by an arcuated portion 39, an inclined portion 40 and a radial portion 41. The inclined portion 40 extends from the upper part of the bridge 5 down to the baseplate 4 and the radial portion 41 passes under the heavy sector 3 of the oscillating weight 2 and enters a notch 42 of ring 31 (or 31a) as shown in Figs. 6 and 7, this ring thus transmitting the movements of the member 23 (or 23a) to the regulator 21.

This transmission is ensured in the best possible conditions when the radial arm 41 of the regulator 21 extends in the radial plane of the movement 1 defined by the axis of the balance wheel 22. Moreover, to avoid any lost motion between the regulator and the ring 31, the side walls of notch 42 are slightly oblique (as shown in Fig. 7) and the radial portion 41 is somewhat tapered (as shown in Fig. 1), so that the free end of portion 41 enters notch 42 without any play. Manufacturing imprecisions are automatically compensated because of the elasticity in axial direction with respect to the movement 1 of the regulator pointer.

Since the movement 1 is set into the watchcase from above in Fig. 6 and since the notch 42 is located in the opening 35, the portion 41 of the regulator can easily be set into the notch 42, when setting the watch movement 1 into the case member 7.

Various changes in the shape, sizes and arrangement of parts could of course be resorted to without departing from the spirit of the invention or sacrificing the advantages thereof.

I claim:

1. In a watch the combination of a casing having a wall enclosing an inner space, a movement located in said inner space of said casing and having parts spaced from said casing wall to form an annular gap between said movement and said casing wall, a running rate regulator pivotally mounted on said movement, a control member passing across said casing wall and having one end accessible from outside said casing and another end extending into said annular gap, and a ring located in said gap and surrounding said movement, said ring being rotatable coaxially to said movement and operatively connecting said control member to said regulator.

2. In the watch of claim 1, said control member being located entirely within said casing wall and comprising a rotatable stem passing across said casing wall and a crank lever fixed to said stem, said ring being provided with a notch, and said crank lever entering said notch to move said ring around said movement upon a rotary motion of said control member around said stem.

3. In the watch of claim 1, said ring being provided with a notch, and said regulator having an arm extending into said notch.

4. In the watch of claim 3, said movement having a circular shape and an axis passing through the center of said circular shape, said regulator being pivotally mounted for rotary motions around an axis parallel to the axis of said movement, said arm of the regulator having an end portion extending into said notch of said ring, and said end portion of the regulator arm extending in the plane defined by said movement axis and by the axis of rotation of said regulator.

5. In a watch the combination of a casing comprising: a case band having a cylindrical inner face and two annular projections extending inward from said face in parallel to one another, said projections being axially spaced from one another so as to define an annular cylindrical space therebetween; a resilient split ring freely applied against the cylindrical inner face of said case band and located in said annular cylindrical space for rotary motions coaxial to said case band; a movement located in said case band and spaced from said ring; a running rate regulator pivotally mounted on said movement and operatively connected to said ring so as to pivot with respect to the movement upon a rotary motion of said ring coaxial to said case band; and a control member passing across said case band and having one end accessible from outside said case band and another end projecting inward from said case band inner face and operatively engaging said ring for driving it in rotation with respect to said case band upon actuation of said control member from said one end thereof.

6. In the watch of claim 5, said movement having: a cylindrical frame work comprising a circular baseplate and bridges fixed thereon, at a predetermined distance from the periphery of said baseplate so as to form an annular path above said baseplate and around said bridges; and an oscillating weight to wind up said movement automatically; said weight being pivotally mounted in the center of said movement, above said bridges for unlimited rotations coaxially to the movement and having a peripheral heavy sector extending in said annular path and moving therewithin, said regulator being pivotally mounted on one of said bridges and having a bent projection passing under said heavy sector of the oscillating weight.

7. In the watch of claim 6, said casing comprising a one piece member forming together the bottom and the case band of said casing.

References Cited in the file of this patent

UNITED STATES PATENTS

| | | |
|---|---|---|
| 548,008 | Rebello | Oct. 15, 1895 |

FOREIGN PATENTS

| | | |
|---|---|---|
| 179,159 | Switzerland | Jan. 2, 1936 |
| 268,588 | Switzerland | Sept. 1, 1950 |
| 300,075 | Switzerland | Sept. 16, 1954 |